Nov. 6, 1962 R. W. SPROUL ETAL 3,063,011
WIDE DYNAMIC RANGE COMMUNICATIONS RECEIVER
Filed July 6, 1959
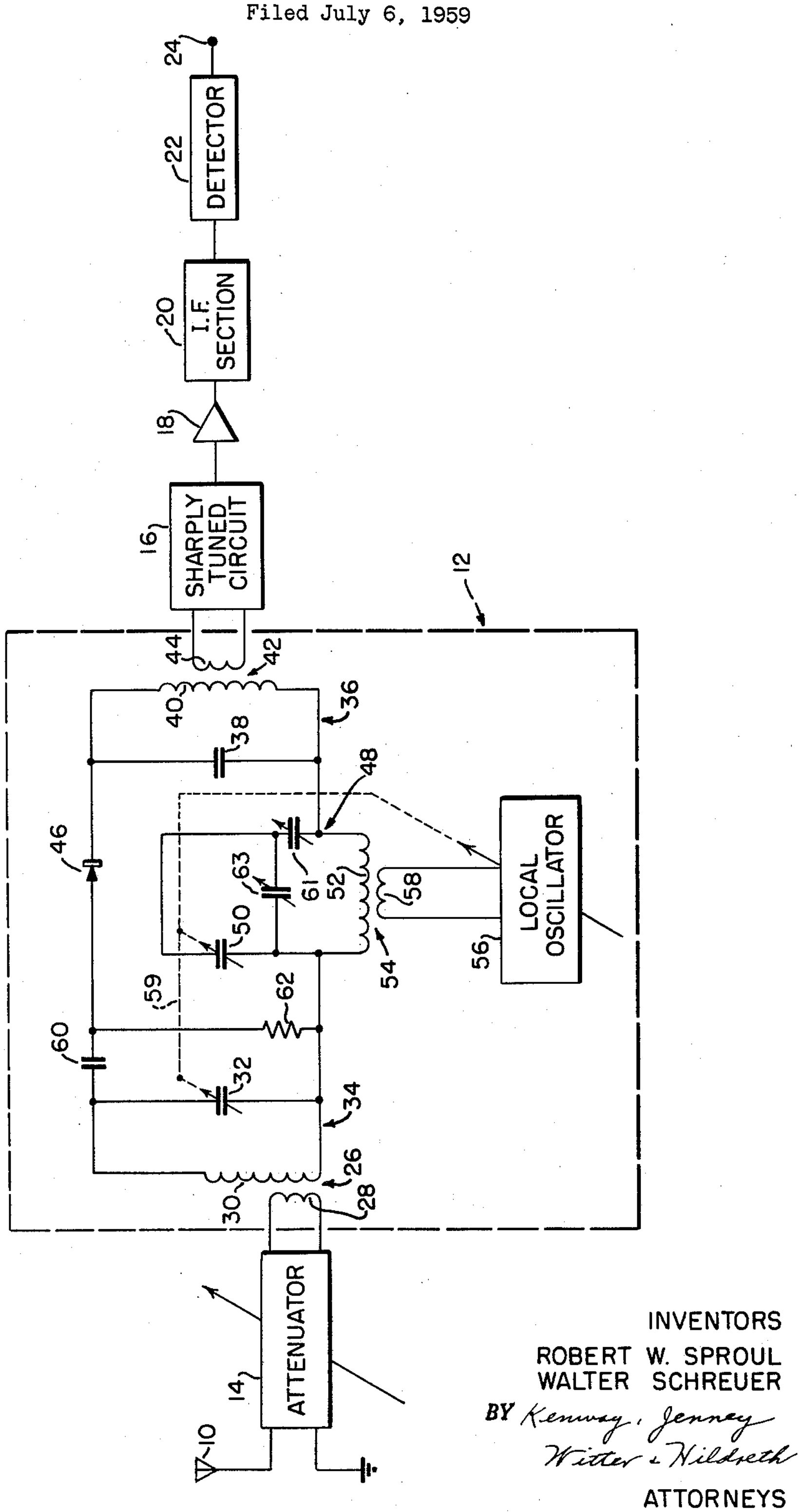
INVENTORS
ROBERT W. SPROUL
WALTER SCHREUER
BY Kenway, Jenney, Witter & Hildreth
ATTORNEYS 3,063,011

WIDE DYNAMIC RANGE COMMUNICATIONS RECEIVER

Robert W. Sproul, Lexington, and Walter Schreuer, Arlington, Mass., assignors to National Company, Inc., Malden, Mass., a corporation of Massachusetts Filed July 6, 1959, Ser. No. 825,248
15 Claims. (Cl. 325—439)

This invention relates to a novel radio communications receiver characterized by immunity from adjacent channel interference. The receiver, which is useful for high frequency communications applications, combines a variable reactance amplifier-frequency converter with a sharply tuned filter to discriminate between a desired input signal and an interfering signal whose strength at the amplifier input may be as much as 140 db greater than the strength of the desired signal.

The design of radio receivers operating in the region below 50 megacycles involves certain problems common to all frequencies. One of these is the detection of weak signals in the presence of noise generated both within and wtihout the receiver. In the above frequency range, low noise stages in the input portion of the receivers, such as cascode amplifiers, have reduced internal receiver noise well below the external noise level so that further improvement in this direction has not been necessary. Adjacent channel interference, on the other hand, is a problem largely peculiar to frequencies below 50 megacycles. This portion of the spectrum is comparatively crowded because it supports long range radio communication, and therefore it is common, when receiving a signal on one frequency, to encounter interference in the form of a much stronger signal on an adjacent frequency.

Separation of two signals on different frequencies is accomplished by filters of various types. If the signal of interest is relatively weak and the interfering signal is close in frequency and much stronger, a very sharp filter is needed to separate the two. A filter of this type generally uses electro-mechanical elements such as piezoelectric or magnetostrictive transducers and is fixed tuned, i.e., the frequency passed by the filter cannot be altered appleciably during use. For this reason, in the commonly used superheterodyne circuits, sharp filters are restricted to the intermediate frequency sections of tunable receivers where the frequency of all received signals is constant. A filter in the radio-frequency or input section of a tunable receiver has to be itself tunable to pass signals at different frequencies as the receiver is tuned.

Prior to our invention it was attempted to overcome the problem of adjacent channel interference by passing the received signal through a tunable filter to obtain a moderate amount of preselection and then converting it to a fixed intermediate frequency by means of a resistance type mixer stage. The converted signal was then passed through a sharp filter tuned to the intermediate frequency to separate the desired signal from the interfering signal. However, even with the moderate preselection obtainable prior to frequency conversion, there were many cases where the interfering signal was so much stronger than the desired signal that intermodulation of the two signals occurred in the mixer stage, resulting in objectionable distortion in the signal of interest. Also, the sensitivity of the mixer was reduced to a point where the ability of the receiver to detect weak signals was seriously affected. The problem of interfering adjacent channel signals is of particular importance in installations where it is desired to transmit and receive simultaneously on frequencies close to each other. In such cases the interfering signal may have an amplitude of several volts as compared with a desired signal on the order of microvolts.

Accordingly, it is a principal object of our invention to provide a tunable radio communications receiver operable at frequencies below 50 megacycles which is capable of improved discrimination between desired and interfering signals. Another object of the invention is to provide a receiver of the above character whose internal noise generation is significantly less than atmospheric and antenna noise over its range of operation. A further object of the invention is to provide a receiver of the type described which causes minimum distortion of the desired signal in the presence of an interfering signal of much greater strength. Another object of our invention is to provide a receiver having the characteristics described which suffers negligible loss of sensitivity in the presence of a strong interfering signal. Yet another object of our invention is to provide a communications receiver of the above character having a construction cost comparable to prior receivers. Other objects of our invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference is made to the drawing which is a diagram of a communications receiver embodying the principles of our invention, the diagram being partially schematic and partially in block and line form.

Our invention makes use of a reactance amplifier, sometimes termed a parametric amplifier, as a frequency converter, followed by a sharp, fixed-tuned filter passing the intermediate frequency and separating out interfering signals. We have found that a converter of this type, operating in the frequency range below 50 megacycles will tolerate approximately a 40 db greater discrepancy in the ratio of the strengths of the interfering and desired signals than prior converters without significant intermodulation distortion and loss of sensitivity.

A frequency converter which has proven highly successful in this application utilizes a p-n junction type silicon diode. These diodes present capacitive reactances across their junctions when biased in the reverse direction, and the capacitance varies with the applied voltage. If a signal is passed through the diode and the voltage from a local oscillator is applied across the diode junction, the capacitance of the diode will vary at a rate corresponding to the oscillator frequency, and in a well-known manner the diode current will include components at the sum and difference frequencies of the signal and oscillator. The circuit values may be chosen to provide power gain in the converter. Since the internal noise of the diode is inherently very low, in fact lower than the best vacuum tubes, amplifiers of this type have found wide usage at frequencies above 50 megacycles. At lower frequencies, vacuum tube circuits have provided the maximum attainable signal-to-noise ratio as pointed out above, and reactance amplifiers have therefore failed to gain commercial adoption in receivers for these frequencies.

As seen in the drawing, the input signal to the receiver is supplied from an antenna 10 coupled to a converter generally indicated at 12 by an attenuator 14. The signal is converted to an intermediate frequency in the converter 12 and then passed through a sharply tuned filter 16 to an amplifier 18. The filter 16 is tuned to the intermediate frequency and it effectively rejects all signals at frequencies not in the immediate vicinity of the intermediate frequency. The filter 16 may take the form of a multiple crystal filter having any of several well-known constructions. As an example of the frequency characteristics obtainable from filters of this type, a filter designed for voice communication may have a bandwidth of 6 kilocycles, i.e., 3 kilocycles above and below the center frequency of the filter, and yet attenuate frequencies 6 kilocycles above and below the center frequency by as much as 60 db.

After amplification by the amplifier 18, the signal may be passed through a second IF section 20 where it is converted to a second, lower intermediate frequency for further amplification and filtering. The output of the IF section 20 is connected to a detector 22 which demodulates the signal. For example, if the input to the receiver is an amplitude-modulated audio signal, the detector 22 may take the form of a rectifier and suitable filter whose output at the output terminal 24 is in the audio frequency range. The electrical output may then be amplified further, if desired, and converted to an audible signal by a suitable transducer such as a loudspeaker (not shown).

As illustrated in the drawing, the converter 12 includes an input transformer 26 with a primary winding 28 connected to the attenuator 14. A secondary winding 30 and a variable capacitor 32 form an input tank 34 tuned to the frequency of the desired input signal. An output tank 36 includes a capacitor 38 and the primary winding 40 of an output transformer 42, tuned to the output frequency of the converter. The secondary winding 44 of the transformer 42 is connected to the filter 16. A variable reactance device such as a p-n type silicon diode 46 and a tank 48 are connected in series with the tanks 34 and 36. The tank 48 comprises a variable capacitor 50 and the secondary winding 52 of a transformer 54. The tank 48 is tuned to the frequency of a variable frequency local oscillator 56 connected to the primary winding 58 of the transformer 54. Preferably, the capacitors 32 and 50, associated respectively with the tanks 34 and 48, are mechanically ganged with the frequency-adjusting element of the oscillator 56, as indicated by the broken line 59, to facilitate tuning of the receiver. Padder and trimmer capacitors 61 and 63, respectively, may be used to minimize tracking error.

A self-biasing arrangement which provides the reverse bias for the diode 46 consists of a capacitor 60 and resistor 62. The biasing circuit operates in the same manner as grid leak biasing used in many vacuum tube circuits. Forward conduction by the diode 46 charges the capacitor 60 to the peak voltage resulting from the sum of the voltages across the three tanks. The voltage across this capacitor opposes conduction by the diode, and further conduction takes place only at succeeding voltage peaks for the short intervals required to replace the charge which has leaked off through the resistor 62. Thus, an effective reverse bias is maintained across the diode 46. The capacitor 60 should have sufficient capacitance to present negligible reactance at the various frequencies used in the converter circuit. While we prefer self-biasing, fixed bias systems of conventional types may also be used if desired.

The time constant of the capacitor 60 and resistor 62 should be long compared to the period between the recurrent voltage peaks but shorter than variations in the strength of the input signal resulting from modulation thereof. This will permit the bias level to follow the modulation and thereby maintain the diode just at the zero voltage (barely conducting) point when the combinded voltages across the tanks 34, 36 and 48 reach their maximum value in the forward direction of the diode. Operation then takes place along the portion of the reactance-voltage curve near the zero voltage point, where the capacitance of the diode is greatest and operation most efficient.

The reverse biasing of the diode 46 cuts off charge carrier conduction across its p-n junction, but it does not prevent passage of alternating current through the diode. It is believed that the bias causes two groups of charge carriers of opposite polarity to be spaced from each other on opposite sides of the junction. This forms an effective capacitor at the junction whose capacitance is a function of the instantaneous voltage across the diode. The capacitance is made to increase and decrease periodically in accordance with a relatively large alternating voltage from the oscillator 56 impressed on the diode by means of the transformer 54.

As the capacitance of the diode 46 varies, it presents a changing impedance to the relatively small signal applied to the diode by the input transformer 30. A mixing action therefore takes place, and the current through the diode contains components at the frequencies of the input signal and local oscillator and, in addition, the sum and difference of these frequencies. The tank 36 is tuned to one of the latter frequencies, and the transformer 42 couples the converter output at this frequency to the filter 16.

As an example, the intermediate frequency passed by the filter 16 may be 34.0 megacycles, equal to the difference between the frequencies of the oscillator 56 and the desired input signal from the antenna 10. In this case, the frequency of the oscillator 56 will be 54 megacycles for an input signal at 20 megacycles and 64 megacycles for a signal at 30 megacycles. For a next lower band of input frequencies, say 13–20 megacycles, a bandswitching arrangement may be used to connect another filter 16 into the circuit which passes 22 megacycles. The oscillator 56 will tune from 35–42 megacycles to cover this band. As the tuning range is extended to lower frequencies, down to 2 megacycles, the width of each band of frequencies covered is made narrower. This is done because the diode 46 operates not only as a mixer but also as a harmonic generator, generating various types of interference if any two of the input signal frequency (or a frequency close to it), the oscillator frequency or the desired intermediate frequency are harmonically related. At higher frequencies, this limits the coverage of each band to an approximate ratio of approximately 1/1.5 between the lowest and highest frequencies in the band. At lower signal frequencies, a high intermediate frequency is a higher order harmonic of the signal frequency, and the strengths of higher order harmonics generated by the diode 46 are much less than the strengths of the lower order harmonics. This fact substantially mitigates the harmonic generator problem and permits coverage of an octave or more (a frequency ratio of ½) in each band. However, an octave at 2 megacycles contains a frequency spread of only 2 megacycles, as compared with the spread of 10 megacycles in the above 20–30 megacycle band. Thus, even though the frequency ratio is greater, the bandwidth is narrower.

We have found that for optimum results, the peak value of the voltage from the oscillator 56 should be at least three times as great as the sum of the peak values of the input signal voltage and the output voltage across the diode. The tanks 34, 36 and 48 have low impedances compared to the diode 46 impedance at all frequencies present in the converter 12 except the frequencies to which they are tuned, and therefore this relationship may be expressed by $$V_{48} \geqq 3(V_{34} + V_{36})$$

where $V_{34}$, $V_{36}$ and $V_{48}$ are the voltages across the respective tanks. The voltage $V_{48}$ may be preset to accommodate the strongest expected input signal appearing at the tank 34.

The operation of the diode 46 provides frequency conversion which is substantially free of intermodulation distortion even relatively large voltages are impressed across it. The limiting factor is the breakdown voltage, above which the diode conducts in the reverse direction, thereby destroying the capacitance effect.

The strength of an interfering adjacent channel signal appearing across the tank 34 may be several volts, and with the gain obtainable from the diode 46, the voltage of the converted signal corresponding to this adjacent channel signal appearing across the tank 36 may be several times as great. Following the above criterion for the oscillator voltage across the tank 48, the peak voltage across the diode 46 will be substantial. Therefore, it is desirable to select a diode which can accommodate a relatively large voltage. A suitable diode for use in communications receivers is the type 1N663 silicon junction diode.

Because of the low noise generation of the diode 46 in its variable reactance application, substantial gain in the converter 12 is not necessary so long as the noise figure of the amplifier 18 is sufficiently low. As pointed out above, the noise figures of good vacuum tube amplifiers are lower than needed in the 2–50 megacycle range. Therefore, the noise figure of the entire receiver does not suffer significantly even if the gain of the converter 12 is reduced to unity ($V_{34}=V_{36}$). In fact, the rejection of interfering signals is aided by low gain in the converter. In such case, the output voltage $V_{36}$ is lower for a given input voltage $V_{34}$, and a greater adjacent channel interfering voltage $V_{34}$ across the tank 34 can be tolerated before the sum of $V_{34}$ and $V_{36}$ exceeds the desirable limit given above. In other words, the strength of the interfering signal may be considerably greater without causing intermodulation distortion and desensitizing the receiver.

The gain of the converter 12 may be maintained at a low level by loading the tank 36 to reduce its impedance and thereby also reduce the voltage $V_{36}$ across it. Also, the gain depends on the relative difference in frequency between the input and intermediate frequencies. When the intermediate frequency is less than twice the signal frequency, the gain is considerably less than it would be with a frequency difference of several octaves.

The attenuator 14 provides further interference discrimination in many cases. Where the strength of the desired input signal is greater than necessary for reception with a satisfactory signal-to-noise ratio, the attenuator may be adjusted to decrease the strength of the signal and, along with it, the strength of the interfering signal. The attenuator 14 may be frequency selective to attenuate the desired input frequency less than other frequencies. If so, it should be tunable and ganged to the capacitors 32 and 50 and ocsillator 56 so as to be tuned with them.

The dynamic range of receivers incorporating our invention is better than 140 db. That is, they can accommodate a desired input signal of usable strength together with an interfering signal whose strength at the tank 34 is 140 db greater without suffering appreciable desensitization and distortion. This is about 40 db better than obtainable with vacuum tube circuits. The improvement over transistor circuits is even greater.

In summary, the improved results provided by our receiver are accomplished by using a reactance amplifier-converter as the first active element in the receiver. Other components between the converter and the signal source are linear passive elements which present no problem of dynamic range. The dynamic range of the converter is much greater than that of amplifiers or converters to which the interfering signals are applied at full relative strength in prior receivers. Therefore, both the desired and interfering signals are converted to the first intermediate frequency band of the receiver in a linear manner, and a filter passing the intermediate frequency serves in large measure to reject the interfering signal.

Because it is in an intermediate frequency section of the receiver, a highly selective fixed-tuned filter can be used to drastically cut the relative strength of the interfering signal, which is not, of course, possible in prior receivers utilizing vacuum tube or transistor converters of less dynamic range. Amplification and further frequency conversion may then follow without exceeding the dynamic capabilities of vacuum tubes or transistors used for this purpose. If desired, further filterings may be used at a lower intermediate frequency or, in the case of cw transmission, at an audio frequency to completely eliminate the interference. While we have described a specific receiver which provides the various advantages enumerated above, it will be apparent that many variations in the circuit may be made within the purview of our invention. For example, the tanks 34, 36 and 48 and transformers 26, 42 and 54, might be replaced by pi networks or other suitable tuning and coupling devices.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said fall therebetween.

We claim:

1. An improved tunable communications receiver for operation in the frequency range below 50 megacycles, said receiver comprising input tuning means tunable to frequencies in said frequency range, a variable reactance type frequency converter, biasing means to bias said converter for operation in the linear region of its conversion characteristic, a local generator, means for applying the signals from said input tuning means and said local generator to said converter, whereby said converter generates an intermediate frequency signal, a highly selective band pass filter tuned to said intermediate frequency, said filter having an attenuation at twice its bandwidth at least 57 decibels greater than the attenuation at the extremes of the designed pass band, means for passing the output signal of said converter including said intermediate frequency through said filter, an amplifier connected to amplify the output of said filter and means for detecting the signal appearing at the output of said amplifier.

2. An input section for a tunable radio communications receiver operative in the frequency range below 50 megacycles, said input section comprising a tunable variable reactance type frequency converter adapted to convert a radio frequency signal in said frequency range to a fixed intermediate frequency signal biasing means to bias said converter for operation in the linear region of its conversion characteristic, and a highly selective filter adapted to pass said intermediate frequency, said filter having an attenuation at twice its bandwidth at least 57 decibels greater than the attenuation at the extremes of the designed pass band, said filter being connected to receive said intermediate frequency signal from said converter.

3. The combination defined in claim 2 including an attenuator connected to attenuate the input signal to said converter.

4. The combination defined in claim 2 in which said converter includes a reverse biased p-n type junction diode connected to operate as a mixer for said radio-frequency signal.

5. An improved tunable radio communications receiver for operation in the frequency range below 50 megacycles, said receiver comprising input tuning means tunable in said frequency range, a voltage sensitive variable reactance element, means for applying the output voltage of said input tuning means across said element, a local generator, means for applying the output voltage of said generator across said element thereby developing a signal at a fixed intermediate frequency, biasing means to bias said voltage sensitive variable reactance element for operation in the linear region of its operating characteristic a highly selective fixed frequency band pass filter tuned to said intermediate frequency, said filter having an attenuation at twice its bandwidth at least 57 decibels greater than the attenuation at the extremes of the designed pass band, means for passing said intermediate frequency signal through said filter, an amplifier adapted to amplify the output of said filter and a detector connected to detect the output of said amplifier.

6. The combination defined in claim 5 including an attenuator adapted to attenuate the input signal to said input tuning means.

7. The combination defined in claim 5 in which the impedance of the circuit connected to said element and conducting said intermediate frequency signal therefrom is such as to provide a signal strength for said intermediate frequency signal at said element which is substantially the same as the strength thereat of the output signal of said input tuning means.

8. The combination defined in claim 5 in which said reactance element is a reverse-biased p-n type junction diode and in which said bias is provided by including a self biasing arrangement for said diode.

9. An improved tunable radio communications receiver adapted for operation in the frequency range below 50 megacycles, said receiver comprising an input attenuator adapted to attenuate the input signal to said receiver, a frequency converter adapted to convert the frequency of the output signal from said attenuator to a fixed first intermediate frequency, a highly selective filter fixed tuned to said first intermediate frequency and connected to filter the output signal from said converter, said filter having an attenuation at twice its bandwidth at least 57 decibels greater than the attenuation at the extremes of the designed pass band, an amplifier connected to amplify the output of said filter, an intermediate frequency section connected to convert the output signal of said amplifier to a second intermediate frequency and means for detecting the output of said intermediate frequency section; said converter comprising a loop including an input tank tunable in said frequency range, an output tank tuned to said first intermediate frequency, an oscillator tank and a p-n type diode connected in series with each other; each of said tanks including a capacitor and an inductive winding, an oscillator, a first winding connected to couple the output signal of said oscillator to said inductive winding of said oscillator tank, a second winding connected to couple the output signal of said attenuator to said inductive winding of said input tank, a third winding connected to couple said inductive winding of said output tank to said filter, and means for applying a reverse bias to said diode, said reverse bias causing said converter to operate in the linear region of its conversion characteristic.

10. The combination defined in claim 9 in which said reverse biasing means comprises a capacitor connected in series with said diode and a resistor connected in parallel with said capacitor, the time constant of said resistor-capacitor combination being substantially greater than the period between recurrent voltage peaks across said diode and less than the period of modulation of the input signal to said receiver.

11. The combination defined in claim 9 including means for mechanically coupling said input tank to the tuning element of said oscillator to provide gang tuning of said input tank and said oscillator.

12. The combination defined in claim 8 in which said self-biasing arrangement maintains the minimum bias required to substantially prevent forward conduction in said diode.

13. The combination defined in claim 9 in which said reverse bias means maintains the minimum bias on said diode required to prevent substantial forward conduction thereof.

14. The combination defined in claim 1 in which said signal applying means applies a signal from said local generator across said converter whose peak value is at least three times the sum of the peak values of the intermediate frequency signal and the signal from said input tuning means across said converter.

15. An improved tunable radio communications receiver for operation in the frequency range below 50 megacycles, said receiver comprising input tuning means tunable in said frequency range, a p-n type junction diode, means for applying the output of said tuning means across said diode, a local generator, means for applying the output voltage of said generator across said diode, thereby developing a signal at an intermediate frequency, means for applying to said diode the minimum reverse bias required to prevent substantial forward conduction therein, a highly selective fixed frequency band pass filter tuned to said intermediate frequency, said filter having an attenuation at twice its bandwidth at least 57 decibels greater than the attenuation at the extremes of the designed pass band, means for passing said intermediate frequency signal through said filter, an amplifier adapted to amplify the output of said filter and a detector connected to detect the output of said amplifier, said local generator having an output voltage great enough so that the peak voltage therefrom across said diode is at least three times the sum of the peak values of the voltage from said input tuning means and the intermediate frequency voltage across said diode.

References Cited in the file of this patent

UNITED STATES PATENTS

| | | |
|---|---|---|
| 1,693,662 | Ohl | Dec. 4, 1928 |
| 2,280,605 | Roberts | Apr. 21, 1942 |
| 2,308,258 | Armstrong et al. | Jan. 12, 1943 |
| 2,608,649 | Magnuski | Aug. 26, 1952 |
| 2,608,650 | Myers | Aug. 26, 1952 |
| 2,719,223 | Van der Ziel et al. | Sept. 27, 1955 |
| 2,773,979 | Chatterton | Dec. 11, 1956 |
| 2,778,934 | Tongue | Jan. 22, 1957 |
| 2,896,018 | Rhodes et al. | Jan. 21, 1959 |